United States Patent
Hu et al.

(10) Patent No.: US 9,548,620 B2
(45) Date of Patent: Jan. 17, 2017

(54) SYSTEM AND METHOD FOR POWER CHARGING OR DISCHARGING

(75) Inventors: Min Hu, Shanghai (CN); Yunfeng Liu, Shanghai (CN); Hai Yang, Shanghai (CN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 784 days.

(21) Appl. No.: 13/976,605

(22) PCT Filed: Dec. 7, 2011

(86) PCT No.: PCT/US2011/063655
§ 371 (c)(1),
(2), (4) Date: Jun. 27, 2013

(87) PCT Pub. No.: WO2012/091866
PCT Pub. Date: Jul. 5, 2012

(65) Prior Publication Data
US 2013/0270116 A1    Oct. 17, 2013

(51) Int. Cl.
*C02F 1/469* (2006.01)
*H02J 7/00* (2006.01)
(Continued)

(52) U.S. Cl.
CPC .......... *H02J 7/0068* (2013.01); *C02F 1/4604* (2013.01); *C02F 1/4691* (2013.01);
(Continued)

(58) Field of Classification Search
CPC .............................. C02F 1/4691; C02F 1/4604
See application file for complete search history.

(56) References Cited

U.S. PATENT DOCUMENTS 5,875,105 A    2/1999    Kim
5,954,937 A *  9/1999    Farmer ............... B01J 49/0052
                                                      204/267

(Continued)

FOREIGN PATENT DOCUMENTS

CN    1842958 A    10/2006
CN    101170264 A    4/2008
(Continued)

OTHER PUBLICATIONS

Unofficial English translation of Office Action from corresponding CN Application 201010611316.6 dated Sep. 5, 2013.
(Continued)

*Primary Examiner* — Bryan D. Ripa
(74) *Attorney, Agent, or Firm* — GE Global Patent Operation

(57) ABSTRACT

A system comprising a plurality of stacks and a plurality of converters, each of the plurality of converters is operable to charge a corresponding stack for adsorbing ions in a liquid, wherein when one of the plurality of stacks is charged or discharged at a first state, one of the plurality of converters associating with the stack operates in a first mode, and is configured to indirectly convert a first voltage to a second voltage at least by an intermediate stage, one of the plurality of stacks is charged or discharged at a second state, one of the plurality of converters associating with the stack operates in a second mode, and is configured to directly convert the first voltage to the second voltage.

15 Claims, 10 Drawing Sheets

(51) Int. Cl.
*C02F 1/46* (2006.01)
*H02M 3/158* (2006.01)
*H02M 1/00* (2006.01)

(52) U.S. Cl.
CPC ............... *C02F 2201/4616* (2013.01); *C02F 2201/46135* (2013.01); *C02F 2303/10* (2013.01); *H02M 3/1584* (2013.01); *H02M 2001/007* (2013.01); *Y02W 10/30* (2015.05)

(56) References Cited

U.S. PATENT DOCUMENTS

| | | | |
|---|---|---|---|
| 6,469,483 | B2 | 10/2002 | Katayama |
| 6,709,560 | B2 | 3/2004 | Andelman et al. |
| 6,798,177 | B1 | 9/2004 | Liu et al. |
| 6,879,135 | B2 | 4/2005 | Fontanella |
| 7,023,187 | B2 | 4/2006 | Shearon et al. |
| 7,479,769 | B2 | 1/2009 | Xu |
| 7,616,465 | B1 | 11/2009 | Vinciarelli |
| 7,813,106 | B2 | 10/2010 | Cai et al. |
| 2004/0174152 | A1 | 9/2004 | Hwang et al. |
| 2006/0042251 | A1 | 3/2006 | Villalobos |
| 2007/0158185 | A1 | 7/2007 | Andelman et al. |
| 2008/0105551 | A1* | 5/2008 | Wang ............ C02F 1/4691 204/627 |
| 2008/0185294 | A1 | 8/2008 | Cai et al. |
| 2008/0185346 | A1* | 8/2008 | Xiong ............ C02F 1/4691 204/554 |
| 2008/0278979 | A1 | 11/2008 | Ortiz-Lopez et al. |
| 2009/0039852 | A1 | 2/2009 | Fishelov et al. |
| 2009/0110806 | A1 | 4/2009 | Cai et al. |
| 2009/0315397 | A1 | 12/2009 | Udo |
| 2011/0073487 | A1* | 3/2011 | Niu ............... C02F 1/4691 205/687 |
| 2011/0186529 | A1* | 8/2011 | Wright ............ B01D 35/26 210/808 |

FOREIGN PATENT DOCUMENTS

| | | |
|---|---|---|
| CN | 101331088 A | 12/2008 |
| CN | 101563296 A | 10/2009 |
| CN | 101595064 A | 12/2009 |
| EP | 2315342 A1 | 4/2011 |
| JP | 2010082606 A | 4/2010 |
| WO | 2005022737 A1 | 3/2005 |
| WO | 2007060998 A1 | 5/2007 |
| WO | 2007070594 A2 | 6/2007 |
| WO | 2010037138 A2 | 4/2010 |
| WO | 2011014013 A1 | 4/2011 |
| WO | 2011041013 A1 | 4/2011 |
| WO | 2011138663 A1 | 11/2011 |

OTHER PUBLICATIONS

Jain, "Bi-Directional DC-DC Converterer for Low Power Applications", pp. 1-146, Feb. 1998.

Chung "Generalized Structure of Bi-Directional Switched-Capacitor DC/DC Converters", IEEE Transactions on circuits and Systems I: Fundamental Theory and Applications, Volume No. 50, Issue No. 6, pp. 743-753, Jun. 2003.

Cacciato et al., "A Critical Evaluation and Design of Bi-Directional DC/DC Converters for Super-Capacitors Interfacing in Fuel Cell Applications", Proceedings of IAS 39th IEEE Industry Applications Conference Annual Meeting, Rome, Italy, Volume No. 2, pp. 1127-1133, Oct. 3-7, 2004.

Krismer et al., "A Comparative Evaluation of Isolated Bi-directional DC/DC Converters with Wide Input and Output Voltage Range", In Proceedings of IEEE Industrial Application Conference, pp. 599-606, Oct. 2005.

Isurin, "Cost Effective Resonant DC-DC Converter for Hi-Power and Wide Load Range Operation", IEEE International Symposium on Industrial Electronics, Volume No. 2, pp. 1014-1018, Jul. 9-13, 2006.

Silvestre, "Half-bridge Bidirectional DC-DC Converter for Small Electric Vehicle", International Symposium on Power Electronics, Electrical Drives, Automation and Motion, Ischia, pp. 884-888, Jun. 11-13, 2008.

Waffler et al., "A Novel Low-Loss Modulation Strategy for High-Power Bi-directional Buck+Boost Converters", IEEE Transactions on Power Electronics,Volume No. 24, Issue No. 6, pp. 1589-1599, Jun. 2009.

Unofficial English Translation of Japanese Office Action issued in connection with corresponding JP Application No. 2013-547499 on Oct. 27, 2015.

International Search Report dated Nov. 29, 2012, International Searching Authority.

* cited by examiner

SYSTEM AND METHOD FOR POWER CHARGING OR DISCHARGING

CROSS REFERENCE TO RELATED APPLICATIONS

This is a national stage application under 35 U.S.C. §371(c) prior-filed, co-pending PCT patent application serial number PCT/US11/63655, filed on Dec. 7, 2011, which claims priority to Chinese Patent Application No. 201010611316.6, filed on Dec. 28, 2010, the entire contents of which are incorporated herein by reference.

BACKGROUND TO THE INVENTION

Embodiments of the present invention relate generally to systems and methods for power charging or discharging, and more particularly relate to a system and a method for charging or discharging an energy storage component such as a capacitor.

Less than one percent of water on the earth's surface is suitable for direct consumption in domestic or industrial applications. With the limited sources of natural drinking water, de-ionization of seawater or brackish water, commonly known as desalination, is a way to produce fresh water. There are a number of desalination techniques that are currently employed to de-ionize or desalt a water source.

Capacitive deionization is one of the desalination techniques. When saline water passes through a high-surface-area electrode assembly, ions in the water, such as dissolved salts, metals, and some organics, are attracted to oppositely charged electrodes. This concentrates the ions at the electrodes and reduces the concentration of the ions in the water. When the electrode capacity is exhausted, the saline feed water flow is stopped, and the capacitor is discharged, optionally into a separate, more concentrated solution.

Conventionally, a converter with or without energy recovery capability is used to charge or discharge the electrode assembly. However, the converter typically has low efficiency.

It is desirable to provide a system and method for charging or discharging the energy storage device with improved efficiency to address the above-mentioned problems.

BRIEF DESCRIPTION

In accordance with embodiments disclosed herein, a system for de-ionizing a liquid having charged species is provided. The system includes a plurality of stacks capable of operating in a charging state and a discharging state. The system further includes a plurality of converters. Each of the plurality of converters is electrically coupled to a corresponding one of the plurality of stacks. Each of the plurality of converters is operable to charge the corresponding stack for adsorbing ions in the liquid in the charging state, and to discharge the corresponding stack for desorbing ions adsorbed by the corresponding stack in the discharging state. Each of the plurality of converters is capable of being operated in a first mode and a second mode depending on a charging state or a discharging state of the corresponding stack. When one of the plurality of stacks is charged or discharged at a first state, one of the plurality of converters associating with the stack operates in the first mode, and is configured to indirectly convert a first voltage to a second voltage at least by an intermediate stage. When one of the plurality of stacks is charged or discharged at a second state, one of the plurality of converters associating with the stack operates in the second mode, and is configured to directly convert the first voltage to the second voltage.

In accordance with another embodiment disclosed herein, a converter for supplying electrical energy to charge a load or recovering electrical energy to discharge the load is provided. The converter includes a first converting stage and a second converting stage cascaded with the first converting stage. One of the first converting stage and the second converting stage is operated to convert the electrical energy depending on a charging state or a discharging state of the load.

In accordance with embodiments disclosed herein, a method is provided for operating a converter to charge or discharge a stack. The method comprises the following steps of detecting a charging state or a discharging state of the stack, the stack configured to absorb ions in a liquid in the charging state and to desorb ions in the discharging state; and configuring the converter to either operate in a first mode or in a second mode depending on the detected charging state or the detected discharging state of the stack.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments relating to power charging or discharging will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including", "comprising", or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

As discussed in detail below, embodiments of the present invention relate to a system and method for charging or discharging an energy storage device such as a supercapacitor for de-ionizing or desalting liquid. However, it is understood that embodiments of the present invention may be applied to other applications, including, but not limited to battery chargers or dischargers and uninterruptible power supplies.

A supercapacitor is an electrochemical capacitor that has a relatively higher energy density when compared to a common capacitor. As used herein, "supercapacitor" is inclusive of other high performance capacitors, such as ultracapacitors. A capacitor is an electrical device that can store energy in the electric field between a pair of closely spaced conductors (called 'plates'). When voltage is applied to the capacitor, electric charges of equal magnitude, but opposite polarity, build up on each plate.

Figure 1:
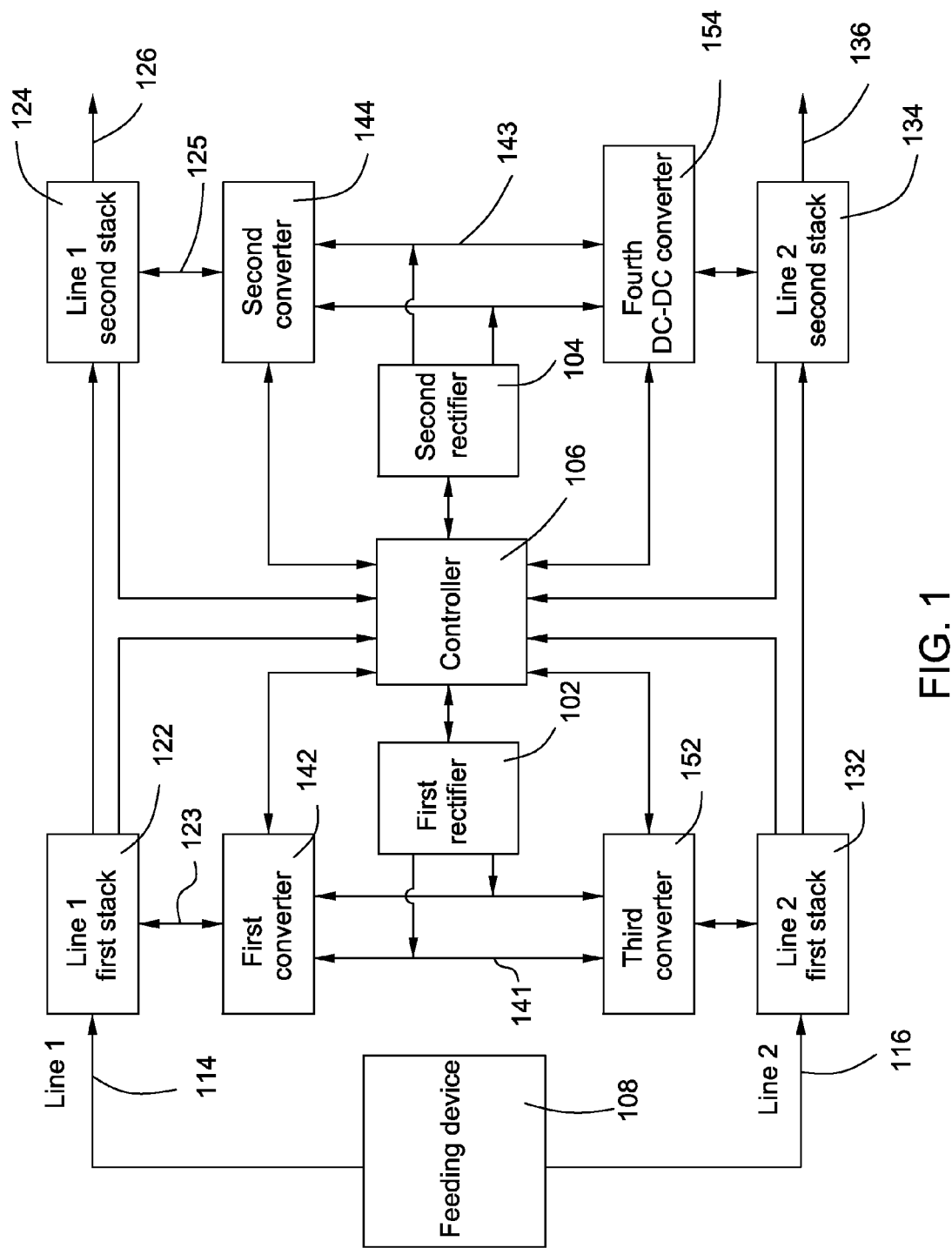
FIG. 1 is a schematic block diagram of a system for power charging or discharging in accordance with an embodiment of the present invention.

FIG. 1 illustrates a system 100 for charging or discharging one or more stacks in accordance with an embodiment of the present invention. Referring to FIG. 1, in an embodiment of the present invention, the system 100 may include a feeding device 108. The feeding device 108 is used for supplying feed liquid to be purified by one or more stacks such as the first stack 122 or second stack 124 of the first line, or the first stack 132 or the second stack 134 of the second line. The feed liquid may include for example seawater, brackish water, cooling tower blowdown water, chemical process wastewater streams, brine, lake water, river water, reservoir water and combinations thereof.

Further referring to FIG. 1, in an embodiment of the present invention, the feed liquid from the feeding device 108 may be split into one or more channels or lines. In an embodiment of the present invention, the feed liquid is supplied via a first line 114 and a second line 116. In an embodiment of the present invention, the feed liquid coming out from the feeding device 108 may be supplied via a single line or more than two lines. In the illustrated embodiment of the present invention, in the first line 114, the feed liquid passes through two stacks including a first stack 122 and a second stack 124. In other implementations, the feed liquid may pass through more than two stacks. Still in other implementations, the feed liquid may repeatedly pass through one or more stacks. As illustrated in FIG. 1, the first stack 122 and the second stack 124 are serially connected. The first stack 122 and the second stack 124 are operated so as to control the salinity of the liquid exiting from the second stack 124 such that it is different from the salinity of the feed liquid entering the first stack 122. The difference in salinity can be higher or lower depending on whether the stacks 122, 124 are in a charging state or a discharging state.

Further referring to FIG. 1, in an embodiment of the present invention, the first stack 122 and the second stack 124 are electrically coupled to a first converter 142 and a second converter 144 respectively. The first converter 142 and the second converter 144 may include bi-directional DC-DC converters. As used herein "bi-directional DC-DC converter" may refer to a converter having the capability of supplying electrical energy to an energy storage component or recovering electrical energy from the energy storage component. As illustrated by arrows 123, 125, the energy flow between the stacks 122, 124 and the respective converters 142, 144 may be in either direction. For example, the electrical energy may either flow from the first converter 142 to the first stack 122 in the charging state of the first stack 122, or the electrical energy may flow from the first stack 122 to the first converter 142 in the discharging state of the first stack 122. In an embodiment of the present invention, the electrical energy recovered from the first stack 122 or the second stack 124 may be supplied to other converters, which in turn supply electrical energy to charge corresponding stacks working in the charging state. In an embodiment of the present invention, the electrical energy recovered from the first stack 122 or the second stack 124 may be fed to an electrical grid.

As will be described in more detail below, the first converter 142 and the second converter 144 may be configured to operate in at least two modes. In an embodiment of the present invention, the first converter 142 and the second converter 144 may switch between a first mode and a second mode either manually or automatically based on one or more defined criteria. In the first mode, the first converter 142 or the second converter 144 may convert a first DC voltage to an intermediate voltage, and then convert the intermediate DC voltage to a second voltage. In the second mode, the first converter 142 or the second converter 144 may directly convert the first voltage to the second voltage without any intermediate converting stages. In an embodiment of the present invention, as a non-limiting example, a voltage difference between the DC voltage at the input of either the first converter 142 or the second converter 144 and the DC voltage at either the first stack 122 or the second stack 124 may be used for determining the working modes. For example, when the voltage difference is determined to be substantially greater than a threshold value, the first converter 142 or the second converter 144 is configured in the first mode. When the voltage difference is substantially smaller than the threshold value, the first converter 142 or the second converter 144 is configured in the second mode. In embodiments of the present invention, charging current or discharging current of the first stack 122 or the second stack 124 may be used to determine the working modes of the first converter 142 or the second converter 144 correspondingly.

Referring further to FIG. 1, the first converter 142 may be electrically coupled to a first rectifier 102 via a first common bus 141, and the second converter 144 may be electrically coupled to a second rectifier 104 via a second common bus 143. The first rectifier 102 is configured to receive and rectify single or multi-phase alternating current (AC) power from an AC power source (not shown in FIG. 1), and provide rectified direct current (DC) power to the first converter 142 via the first common bus 141. The second rectifier 104 is configured to receive and rectify single or multi-phase AC power from the AC power source, and provide rectified DC power to the second converter 144 via the second common bus 143. As will be described in more detail to follow, the first rectifier 102 and the second rectifier 104 may further provide rectified DC power to other converters in association with the second line 116. As a non-limiting example, the first rectifier 102 and the second rectifier 104 may each employ a full-wave bridge having four diodes to transform the AC power to rectified DC power.

The system 100 may further include a controller 106 that may be electrically coupled to various components of the system 100. The controller may be implemented in numerous ways, such as hardware, software, firmware, configurable/programmable logic, or combinations thereof.

In an embodiment of the present invention, as shown in FIG. 1, the controller 106 is electrically coupled to the first converter 142, the second converter 144, the first stack 122, and the second stack 124. The controller 106 may be programmed to automatically switch the working modes of the first converter 142 and the second converter 144. In an embodiment of the present invention, the controller 106 may be configured to monitor a voltage difference between the DC voltage at the input of either the first converter 142 or the second converter 144 and the DC voltage at either the first stack 122 or the second stack 124. The controller 106 may be further configured to compare the voltage difference with a threshold voltage value. The threshold voltage value may be stored in the controller 106 in advance. The controller 106 may be further configured to send control signals to switch the working modes of the first converter 142 and the second converter 144 based on the comparison results.

As further illustrated in FIG. 1, the controller 106 may be further electrically coupled to the first rectifier 102 and the second rectifier 104. The controller 106 may be configured to determine whether one of the two rectifiers 102, 104 or both of the rectifiers 102, 104 should be enabled to operate. In an embodiment of the present invention, the first rectifier 102 may be particularly enabled to provide rectified DC voltage, while the second rectifier 104 may be disabled. In an embodiment of the present invention, both the first rectifier 102 and the second rectifier 104 may be enabled to provide rectified DC power to the first converter 142 and the second converter 144 respectively. Although not particularly illustrated in FIG. 1, in an embodiment of the present invention, the controller 106 may be further electrically coupled to the feeding device 108. In this case, the controller 106 may be configured to send control signals to turn on or switch off the feeding device 108 either manually or automatically. For example, the controller 106 may respond to a user input, and turn on the feeding device 108 accordingly.

With continuing reference to FIG. 1, in the second line 116, the feed liquid from the feeding device 108 passes through a first stack 132 and a second stack 134. The stacks 132, 134 arranged in the second line 116 are similar to the stacks 122, 124 arranged in the first line 114. The stacks 132, 134 may be charged to adsorb ions contained in the feed liquid or discharged to desorb ions adsorbed by the corresponding stacks. The first stack 132 and the second stack 134 in the second line 116 are electrically coupled to a third converter 152 and a fourth converter 154, respectively. The third converter 152 and the fourth converter 154 are configured similarly with respect to the first converter 142 and the second converter 144, respectively. As shown in FIG. 1, the third converter 152 is electrically coupled to the first common bus 141. In an embodiment of the present invention, the third converter 152 may receive rectified DC voltage from the first rectifier 102 via the first common bus 141. The third converter 152 may also supply electrical energy to the first converter 142 via the first common bus 141. Moreover, the stacks 132, 134 and corresponding converters 152, 154 in the second line 116 are electrically coupled to the controller 106. The controller 106 is configured to change the working modes of the converters 152, 154 in a manner similar to that of the converters 142, 144 as described above. An exemplary configuration of the stacks 122, 124, 132, 134 will be described below with respect to FIG. 2.

Figure 2:
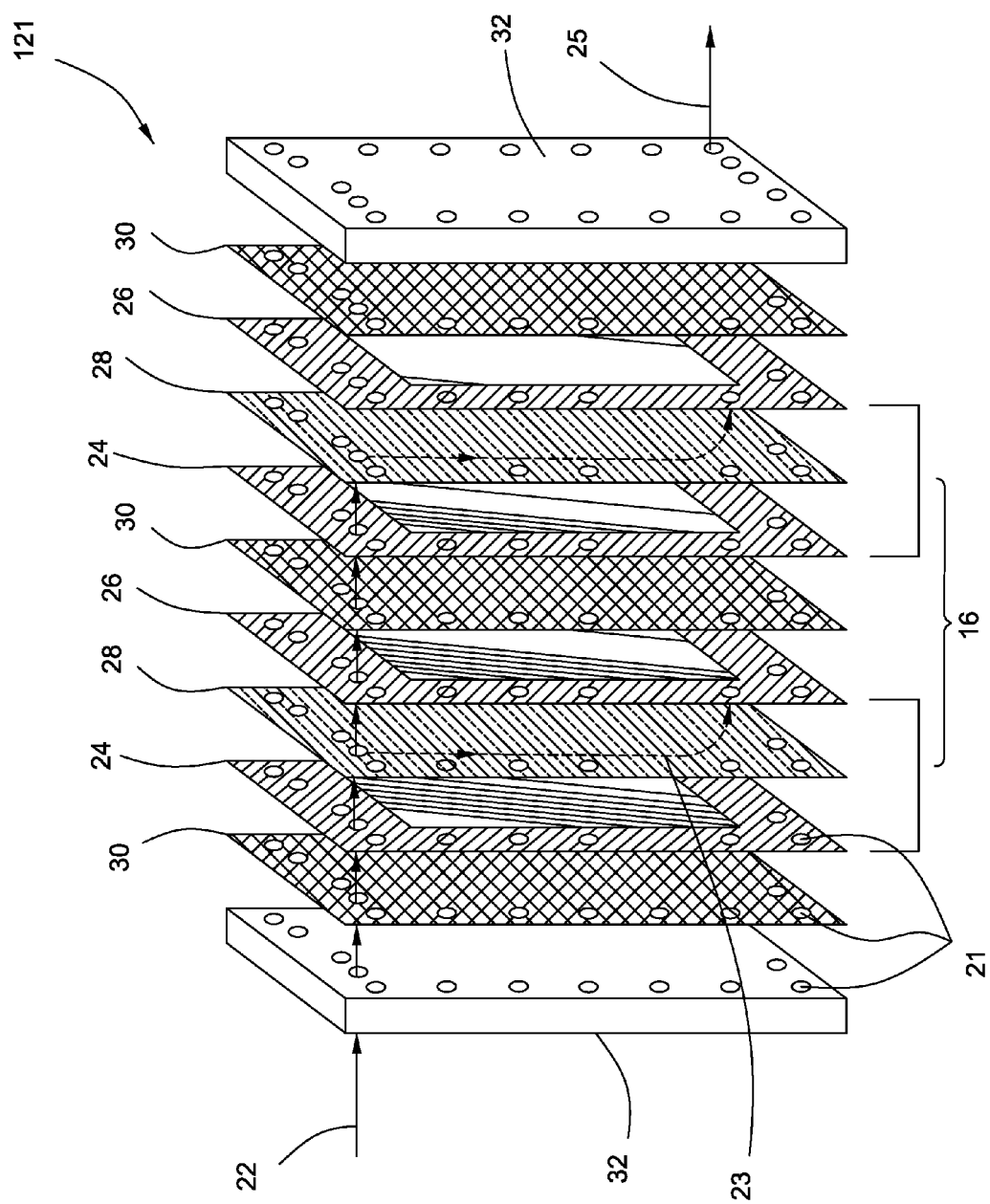
FIG. 2 is an exploded perspective view of a stack in accordance with an embodiment of the present invention.

Referring to FIG. 2, in an embodiment of the present invention, a stack 121 includes two support plates 32, desalination cells 16, and current collectors 30. The desalination cells 16 and current collectors 30 are disposed between the support plates 32. Each desalination cell 16 includes electrodes 24 and 26 and insulating spacers 28. The insulating spacers 28 may include electrically insulative polymers. Suitable electrically insulative polymers may include olefin-based material. Suitable olefin-based material may include polyethylene and polypropylene, which can be halogenated. Other suitable electrically insulative polymers can include, for example, poly vinyl chloride, polytetrafloroethylene, polysulfone, polyarylene ether, and nylon. A plurality of holes or apertures 21 is defined in the support plates 32, the electrodes 24, 26, and the insulating spaces 28 for allowing the feed liquid to flow through. For example, the feed liquid may be introduced into the stack 121 as indicated by directional arrow 22 through aperture 21, flow through at least a portion of the stack 121 as indicated by directional arrow 23, and exit the stack 121 as indicated by directional arrow 25.

Figure 3:
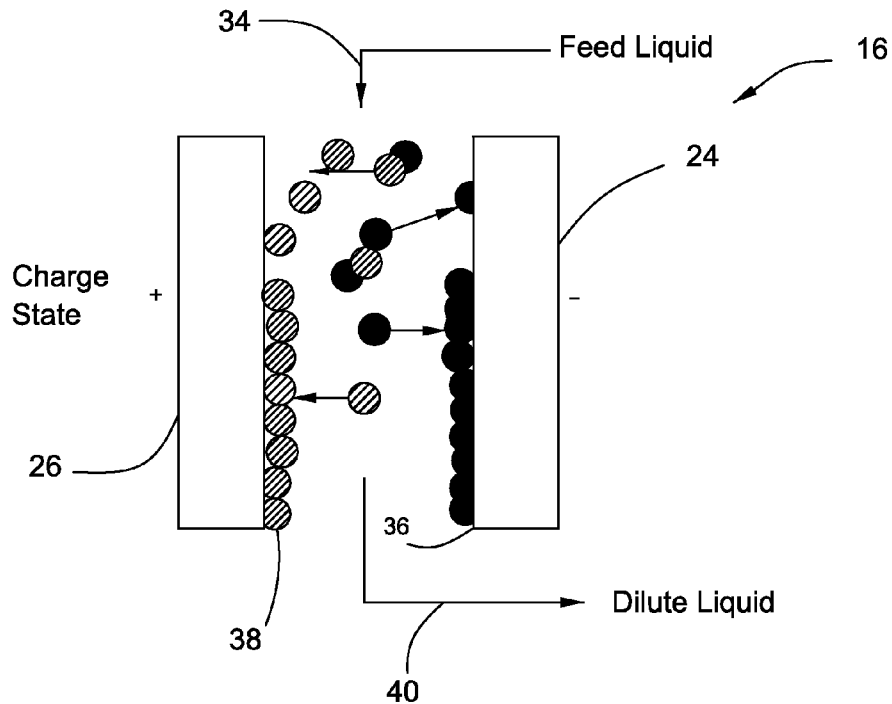
FIG. 3 is a perspective view of a desalination cell during a charging state of operation in accordance with an embodiment of the present invention.

FIG. 3 illustrates a desalination cell 16 during a charging state. Referring to FIG. 3, a feed liquid 34 comprising cations 36 and anions 38 is introduced into the cell 16. The oppositely charged electrodes 24 and 26 attract and retain ions of opposite charge from the feed liquid 34 passing through the desalination cell 16. The liquid leaving the desalination cell 16 contains less of the cations 36 and anions 38 than the feed liquid 34 and is referred to in the figure as the "dilute liquid" 40, which represents a purified liquid. Typically, the electrodes 24 and 26 define a potential difference between about 1 and about 2 volts (direct current voltage). The cations 36 and anions 38 will be adsorbed at the oppositely charged electrodes 24 and 26 until the surfaces are saturated at which point the feed liquid 34 will pass through the desalination cell 16 without any change in the concentration of cations 36 and anions 38.

Figure 4:
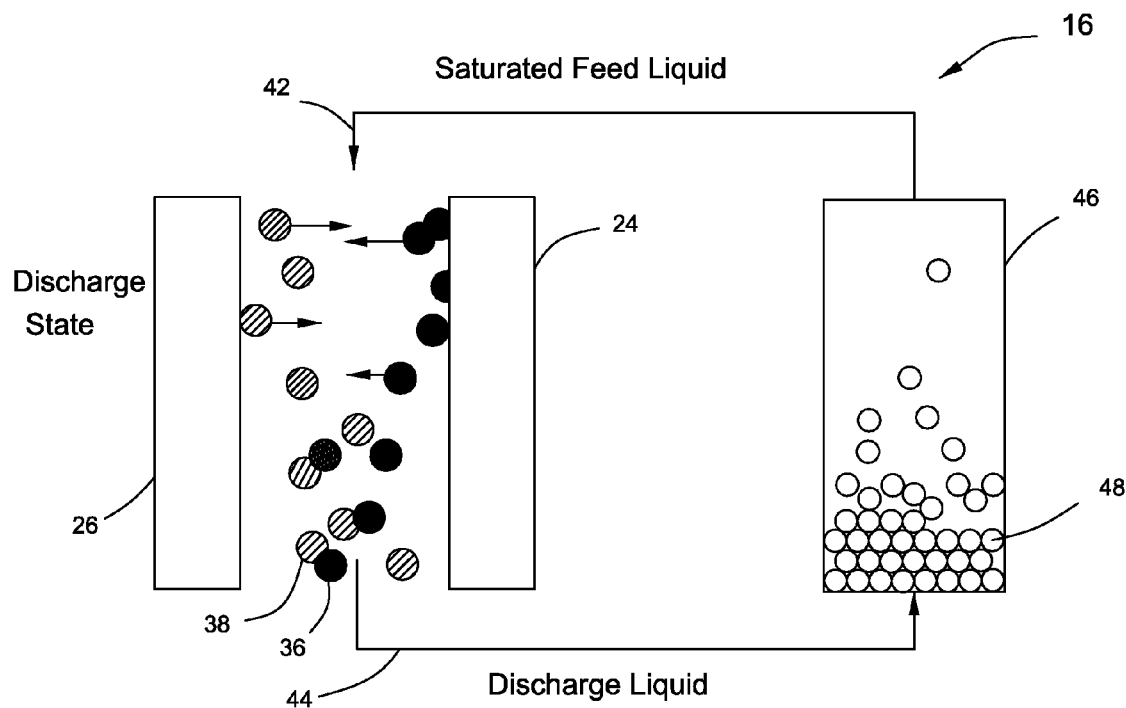
FIG. 4 is a perspective view of a desalination cell during a discharging state of operation in accordance with an embodiment of the present invention.

FIG. 4 illustrates a desalination cell 16 during a discharging state. During the discharging state, the electrodes 24 and 26 are short-circuited and the cations 36 and anions 38 are released from the surfaces of electrodes 24 and 26. In this example, the fluid entering the desalination cell 16 during the discharging state is a saturated or supersaturated stream of ionic solute 42 that leaves a precipitation unit 46. The fluid exiting the cell 16 during the discharging state is referred to as the "discharge liquid" 44 in the figure. The discharge stream 44 is transferred to the precipitation unit 46 where some of the ionic solute separates from the discharge stream 44 as a solid precipitate 48. The fluid in the precipitation unit after precipitation of the ionic solid remains saturated or supersaturated with the ionic solute. However, this stream is less concentrated than discharge stream 44 because of the precipitation of ionic species in the precipitation unit 46.

Figure 5:
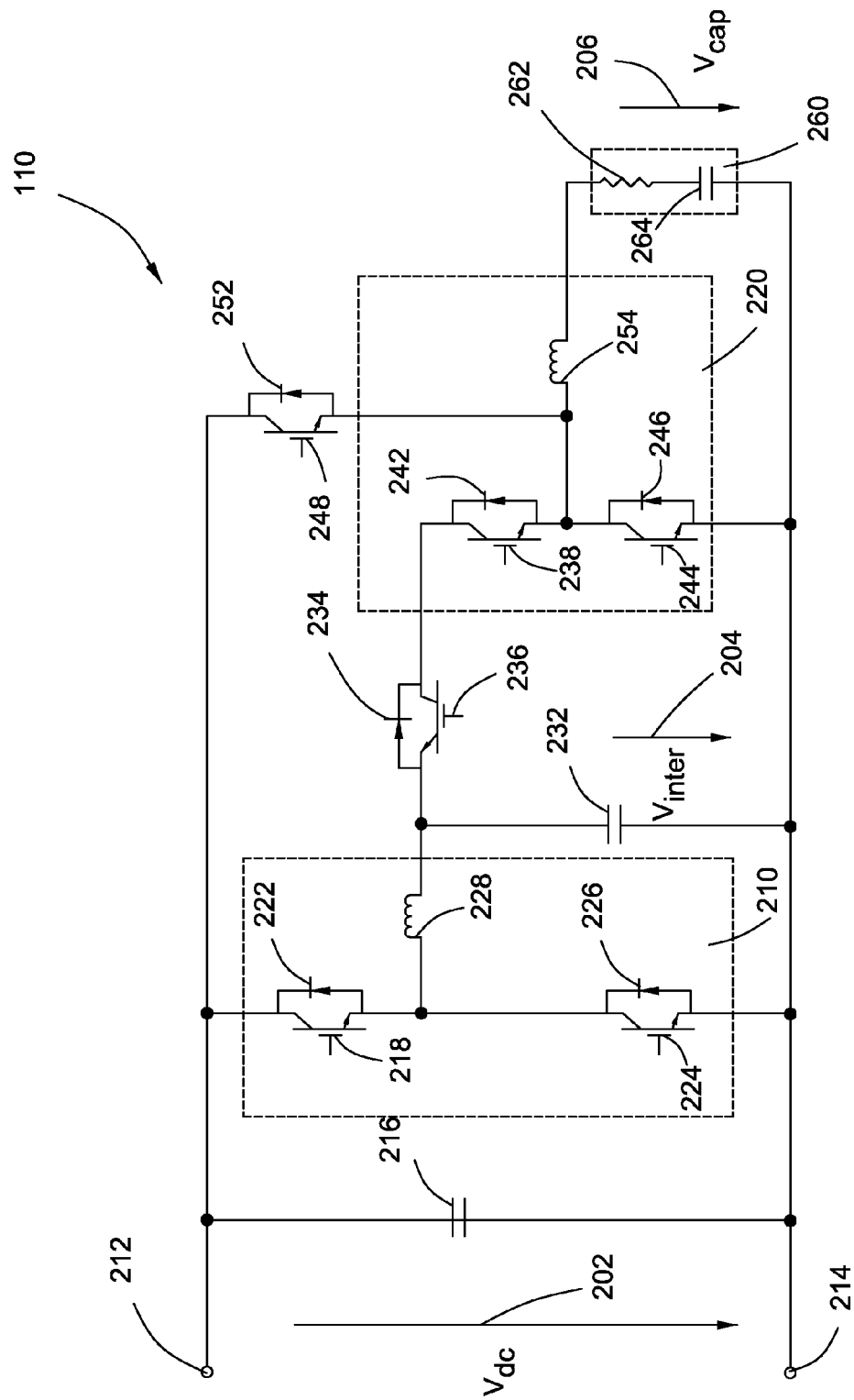
FIG. 5 is a topology of a bi-directional converter in accordance with an embodiment of the present invention, and the bi-directional converter operates in a first mode.

FIG. 5 illustrates a topology of a bi-directional converter 110 in accordance with one embodiment of the present disclosure. The bi-directional converter 110 may apply to the four converters 142, 144, 152, and 154 shown in FIG. 1.

In the illustrated embodiment of the present invention, the bi-directional converter 110 includes two input terminals 212, 214. The two input terminals 212, 214 may be electrically coupled to the first rectifier 102 (shown in FIG. 1) for receiving a rectified DC voltage 202 from the first rectifier 102 and transmitted via the first common bus 141. In one embodiment of the present invention, the DC voltage 202 may be smoothed by a first capacitor 216. The first capacitor 216 may be coupled immediately after the two input terminals 212, 214. In other embodiments of the present invention, the first capacitor 216 may be omitted.

Further referring to FIG. 5, the bi-directional converter 110 may further include a first converting stage 210 and a second converting stage 220. The first converting stage 210 is electrically coupled to the two input terminal 212, 214. The first converting stage 210 is configured to convert a first voltage to an intermediate voltage. In one embodiment of the present invention, the first converting stage 210 may be configured to convert the DC voltage 202 between the two input terminals 212, 214 or the DC voltage smoothed by the first capacitor 216 to an intermediate DC voltage 204. In an embodiment of the present invention, a second capacitor 232 may be coupled between the first converting stage 210 and the second converting stage 220. The second capacitor 232 is configured to maintain the intermediate DC voltage 204 at a substantially fixed level.

The second converting stage 220 is cascaded with or in serial connection with the first converting stage 210. The second converting stage 220 has similar configurations with respect to the first converting stage 210, and is configured to convert an intermediate voltage to a second voltage. In an embodiment of the present invention, the second converting stage 220 is configured to convert the intermediate DC voltage 204 produced by the first converting stage 210 and maintained by the second capacitor 228 to a DC voltage 206. The DC voltage 206 is applied to the stack 260 for charging the stack 260. In an embodiment of the present invention, the stack 260 may be any one of the stacks 122, 124 arranged in the first line 114 or the stacks 132, 134 arranged in the second line 116 (see FIG. 1).

Further referring to FIG. 5, the first converting stage 210 may include a first switching element 218, a second switching element 224, and a first inductor 228. The first switching element 218 and the second switching element 224 are connected in series between the two input terminals 212, 214. In an embodiment of the present invention, the first switching element 218 and the second switching element 224 are coupled in parallel with two diodes 222, 226 respectively. The diodes 222, 226 are used for protecting the corresponding switching elements 218, 224. In an embodiment of the present invention, the diode 222 has its cathode connected to the first input terminal 212, and its anode connected to joint connection between the first switching element 218 and the second switching element 224. The diodes 222, 226 connected with corresponding switching elements 218, 224 and any other diodes having similar connections described below may be referred to as "anti-parallel diode" or "reverse parallel diode". One terminal of the first inductor 228 is coupled to the joint connection between the first switching element 218 and the second switching element 224. The other terminal of the first inductor 228 is electrically coupled to one terminal of the second capacitor 232.

Further referring to FIG. 5, the second converting stage 220 may include a third switching element 238, a fourth switching element 244, and a second inductor 254. The third switching element 238 and the fourth switching element 244 are electrically coupled in series between two terminals of the second capacitor 232. In an embodiment of the present invention, the third switching element 238 and the fourth switching element 244 are coupled with anti-parallel diodes 242, 246 respectively. The diodes 242, 246 are used for protecting the corresponding switching elements 238, 244. One terminal of the second inductor 254 is coupled to a joint connection between the third switching element 238 and the fourth switching element 244. The other terminal of the second inductor 254 is coupled to one terminal of the stack 260.

As shown in FIG. 5, the bi-directional converter 110 may further include a fifth switching element 234 and a sixth switching element 248. The fifth switching element 234 is coupled between the first converting stage 210 and the second converting stage 220. More specifically, the fifth switching element 234 is coupled between the first inductor 228 and the third switching element 238. The sixth switching element 248 is coupled between the first input terminal 212 and a joint connection between the third switching element 238 and the fourth switching element 244. In an embodiment of the present invention, the fifth switching element 234 is coupled with an anti-parallel diode 234, and the sixth switching element 248 is couple with an anti-parallel diode 252. The diodes 234, 252 are used for protecting the corresponding switching elements 234, 248.

The switching elements 218, 224, 234, 238, 244, and 248 described above may be any suitable form of switches operable via electrical control signals from the controller 106 (shown in FIG. 1) to switch between an "on" or conducting state and an "off" or non-conducting state. In an embodiment of the present invention, the switching elements 218, 224, 234, 238, 244, and 248 may include MOSFETs. In other embodiments of the present invention, thyristors, IGBTs, BJTs, or any other semiconductor-based switching components may be used. In other embodiments of the present invention, each of the switching elements 218, 224, 234, 238, 244, and 248 may include a combination of switching components. For example, the switching elements 218, 224, 234, 238, 244, and 248 may individually include two or more semiconductor-based switches connected in series or parallel for operation to selectively transition between on and off states according to corresponding control signals from the controller 106.

During the charging process, the bi-directional converter 110 may switch between a first mode and a second mode for charging the corresponding stack 260. In an embodiment of the present invention, the first mode and the second mode are buck mode. As used herein, "buck mode" refers to when a DC voltage is converted down to a lower voltage. The controller 106 (shown in FIG. 1) may send control signals to the fifth switching element 236 and the sixth switching element 248 to turn off the two switching elements 236, 248, whereby current is not able to flow through the switching elements 236, 248. Because the two switching elements 236, 248 are turned off, both the first converting stage 210 and the second converting stage 220 are enabled to operate.

For the first converting stage 210 operating in the buck mode, the second switching element 224 is turned off by control signals sent from the controller 106, and the first switching element 218 operates in a pulse width modulation (PWM) mode. As used herein, "PWM mode" refers to a control strategy by which a switching element may be alternately turned on and off in response to pulse signals, whereby a duty cycle of the pulse signals may be varied for adjusting a level of the output voltage. When the first switching element 218 is turned on to conduct current, the rectified DC voltage 202 is applied to the first inductor 228. With current flowing through the first inductor 228, energy is temporarily stored in the first inductor 228. When the first switching element 218 is turned off, the first inductor 228 releases the stored energy, which causes current to flow through the diode 226. The energy stored in the first inductor 228 is released to charge the second capacitor 232. By varying the duty cycle of the control signals sent from the controller 106 to the first switching element 218, the level of intermediate DC voltage 204 converted by the first converting stage 210 can be adjusted. In an embodiment of the present invention, the duty cycle is about 0.5, and the intermediate DC voltage 204 can be controlled at about a half of the rectified DC voltage 202. Because the duty cycle of the first switching element 218 is about 0.5, the transformation efficiency of the first converting stage 210 is high.

For the second converting stage 220 operating in the buck mode, the fourth switching element 244 is turned off by control signal sent from the controller 106, and the third switching element 238 operates in a pulse width modulation (PWM) mode. When the third switching element 238 is turned on, the intermediate DC voltage 204 is applied to the second inductor 254. With current flowing through the second inductor 254, energy is temporarily stored in the second inductor 254. When the third switching element 238 is turned off, the second inductor 254 releases the stored energy, which causes current to flow through the diode 246. The energy stored in the second inductor 254 is released to charge the stack 260. The voltage of the stack 260 increases and the duty cycle of the control signals sent from the controller 106 to the third switching element 238 is changed continuously. Because the voltage difference between the intermediate DC voltage 204 and the DC voltage 206 is lower, the transformation efficiency of the second converting stage 220 is high. As a result, the overall transformation efficiency of the bi-directional converter 110 is high.

In other embodiments of the present invention, the current flowing through the second inductor 254 may be provided as a feedback to the controller 106, and the controller 106 in turn controls the charging current according to the feedback current signals. Thus, the bi-directional converter 110 may operate in a constant current mode.

In an embodiment of the present invention, during the charging process of the bi-directional converter 110, the controller 106 may monitor a voltage difference between the rectified DC voltage 202 and the DC voltage 206. When the controller 106 determines that the voltage difference is substantially greater than a threshold value, the bi-directional converter 110 operates in the first mode. The fifth switching element 236 and the sixth switching element 248 are continually turned off to enable both the first converting stage 210 and the second converting stage 220 to operate.

Figure 6:
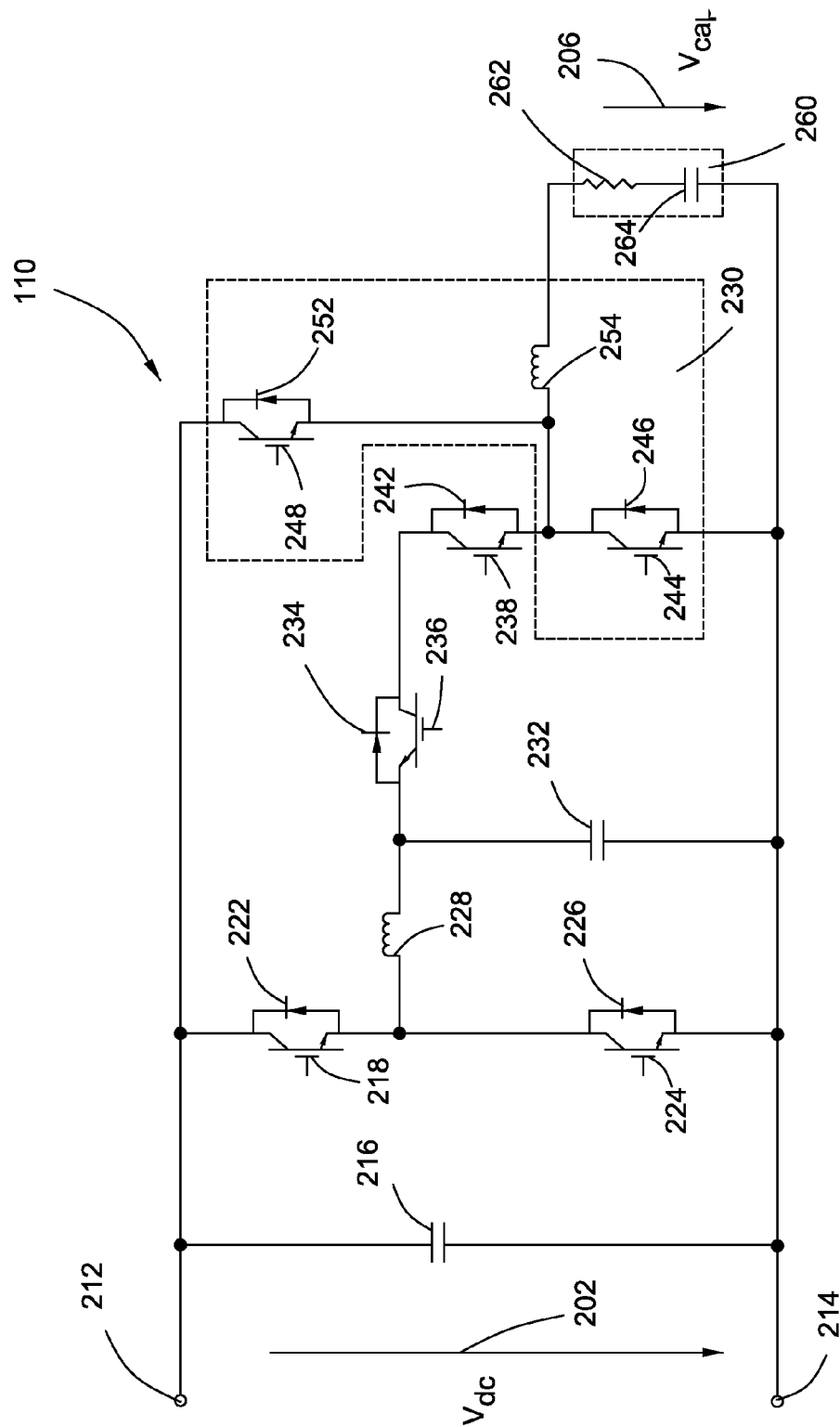
FIG. 6 is the topology of a bi-directional converter shown in FIG. 5, and the bi-directional converter operates in a second mode.

Once the controller 106 determines that the voltage difference is substantially smaller than the threshold value, the controller 106 switches the bi-directional converter 110 from the first mode to the second mode. The controller 106 sends control signals to turn off the third switching element 238. Because the third switching element 238 is turned off, the energy stored in the second capacitor 232 cannot transfer to the second converting stage 220. Referring to FIG. 6, the fourth switching element 244, the sixth switching element 248, and the second inductor 254 forms a third converting stage 230. For the third converting stage 230 operating in the buck mode, the fourth switching element 244 is turned off and the sixth switching element 248 operates in the PWM mode. The rectified DC voltage 202 is directly converted to the DC voltage 206. Because the DC voltage 206 at the stack 260 is high and the voltage difference between the rectified DC voltage 202 and the DC voltage 206 is low, the transformation efficiency of the bi-directional converter 110 is high.

Figure 7:
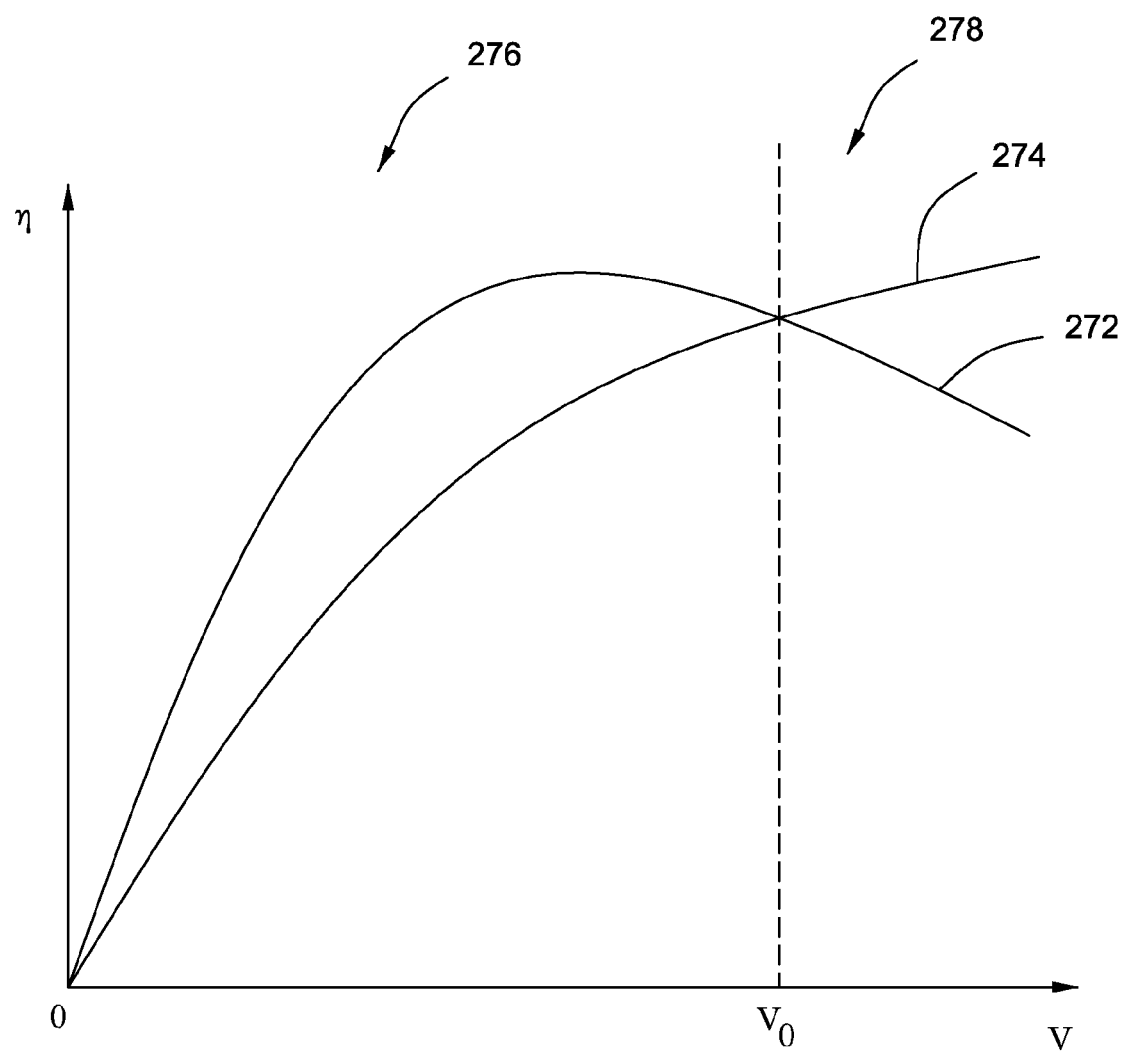
FIG. 7 illustrates transformation efficiency versus voltage across a stack by operating the bi-directional converter in the first mode and the second mode.

Referring to FIG. 7, in an embodiment of the present invention, the voltage across the stack 260 and the transformation efficiency of the converter 110 is illustrated. As shown in FIG. 7, V is a variable in the horizontal axis representing the voltage across the stack 260, and 77 is a variable in the vertical axis representing the transformation efficiency of the converter 110. A first curve 272 shown in FIG. 7 illustrates the converter 110 having both the first converting stage 210 and the second converting stage 220 operating to charge the stack 260. A second curve 274 shown in FIG. 7 illustrates the converter 110 having the third converting stage 230 operating to charge the stack 260. In operation, when the voltage across the stack 260 is determined to be smaller than a threshold value $V_0$, the converter 110 is switched to operate in a first area 276, where the converter 110 has relatively higher transformation efficiency with two converting stages 210, 220 operating. When the voltage across the stack 260 is determined to be greater than the threshold value $V_0$, the converter 110 is switched to operate in a second area 278, where the converter 110 has relatively higher transformation efficiency with one converting stage 230 operating. Therefore, a high transformation efficiency of the converter 110 can be achieved by switching the working modes of the converter 110 according to the charging state of the stack 260.

Referring further to FIGS. 5 and 6, during the discharging process, the bi-directional converter 110 can also switch between a first mode and a second mode for discharging the stack 260. In an embodiment of the present invention, the first mode and the second mode are boost modes. As used herein, "boost mode" refers to when the DC voltage is converted up to a higher voltage. In the discharging process, initially, the DC voltage at the stack 260 is high. When the controller 106 determines that the voltage difference between the rectified DC voltage 202 and the DC voltage 206 is smaller than a threshold value, the controller 106 controls the bi-directional converter 110 to operate in the first mode. In the first mode, the controller 106 sends control signal to turn off the third switching element 238. For the third converting stage 230 operating in the boost mode, the sixth switching element 248 is turned off and the fourth switching element 244 operates in the PWM mode. The DC voltage 206 is directly converted to the rectified DC voltage 202. Because the DC voltage 206 at the stack 260 is high and the voltage difference between the rectified DC voltage 202 and the DC voltage 206 is low, the transformation efficiency of the bi-directional converter 110 is high.

When the controller 106 determines that the voltage difference between the rectified DC voltage 202 and the DC voltage 206 is substantially greater than the threshold value, the controller 106 switches the bi-directional converter 110 from the first mode to the second mode. In the second mode, the controller 106 may send control signals to the fifth switching element 236 and the sixth switching element 248 to turn off the two switching elements 236, 248, and enable both the first converting stage 210 and the second converting stage 220 to operate. The second converting stage 220 converts the DC voltage 206 to intermediate DC voltage 204, and the first converting stage 210 converts the intermediate DC voltage 204 is to the rectified DC voltage 202.

For the second converting stage 220 operating in the boost mode, the third switching element 238 is turned off, and the fourth switching element 244 operates in the PWM mode. For the first converting stage 210 operating in the boost mode, the first switching element 218 is turned off, and the second switching element 224 operates in the PWM mode. The energy stored in the stack 260 is transferred to the second capacitor 232, and then the energy stored in the second capacitor 232 is transferred to the first capacitor 216.

In an embodiment of the present invention, during the discharging process of the first stack 122 in the first line 114, one or more stacks in the second line 116 may operate in the charging process. For example, the first stack 132 in the second line 116 may operate in the charging process. In this case, the energy recovered from the first stack 122 in the first line 114 may be used to charge the first stack 132 in the second line 116 via the third converter 152 (see FIG. 1).

Figure 8:
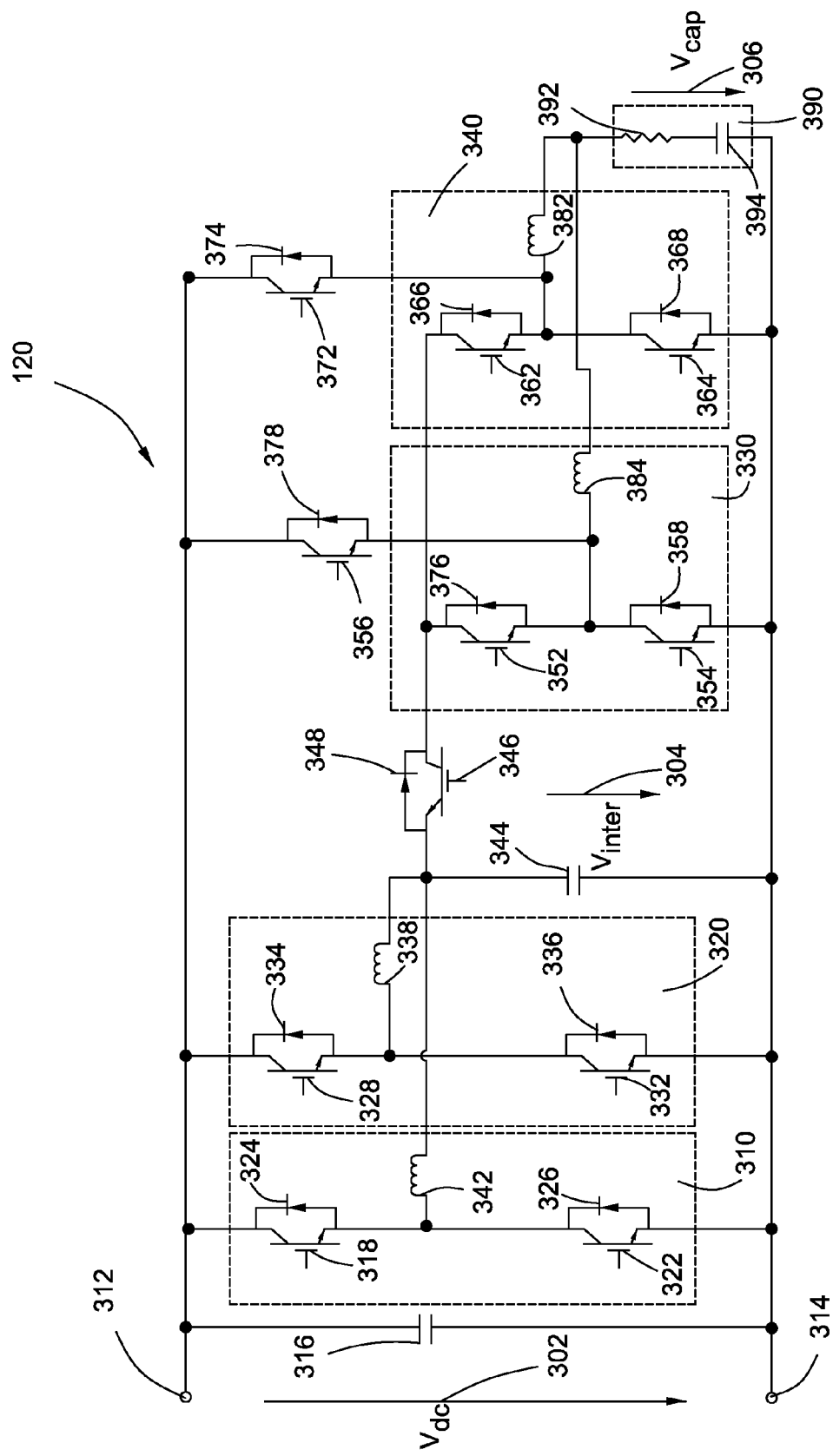
FIG. 8 is a topology of a bi-directional converter in accordance with embodiments of the present invention, and the bi-directional converter operates in a first mode.

FIG. 8 illustrates a topology of a bi-directional converter 120 in accordance with an embodiment of the present invention. Referring to FIG. 8, the bi-directional converter 120 may include two input terminals 312, 314 for receiving rectified DC voltage 302 from the first rectifier 102 (shown in FIG. 1). During the charging process, the bi-directional converter 120 may switch between a first mode and a second mode for converting the rectified DC voltage 302 either directly or indirectly to the DC voltage 306. As used herein, "indirectly" refers to the bi-directional converter having the capability of converting the input DC voltage to one or more intermediate voltages, and converting the one or more intermediate voltages to output DC voltage. During the discharging process, the bi-directional converter 120 may also switch between a first mode and a second mode for recovering energy from a corresponding stack 390.

As illustrated in FIG. 8, in an embodiment of the present invention, the bi-directional converter 120 includes a first converting stage 310, a second converting stage 320, a third converting stage 330, and a fourth converting stage 340. The first converting stage 310 and the second converting stage 320 are coupled in an interleaved manner, and the third converting stage 330 and the fourth converting stage 340 are also coupled in an interleaved manner. As used herein, "interleaved" refers to when two converting stages are substantially coupled in parallel. The first converting stage 310 and the second converting stage 320 are configured similar to the first converting stage 210 as describe above in connection with FIG. 5. The inductor 342 of the first converting stage 310 and the inductor 338 of the second converting stage 320 are commonly connected to the capacitor 344. The third converting stage 330 and the fourth converting stage 340 are configured similarly to the second converting stage 220 as described above in connection with FIG. 5. The inductor 384 of the third converting stage 330 and the inductor 382 of the fourth converting stage 340 are commonly connected to the stack 390.

The bi-directional converter 120 may further include a first switching element 346, a second switching element 356, and a third switching element 372. The first switching element 346 is coupled between the second converting stage 320 and the third converting stage 330. The second switching element 356 is coupled between the first input terminal 312 and a joint connection between the two switching elements 352, 354 of the third converting stage 330. The third switching element 372 is coupled between the first input terminal 312 and a joint connection between the two switching elements 362, 364 of the fourth converting stage 340.

In operation, the bi-directional converter 120 may operate to charge the stack 390. When the controller 106 determines that a voltage difference between the rectified DC voltage 302 and the DC voltage 306 is substantially greater than a threshold value, the controller 106 controls the bi-directional converter 120 to operate in the first mode. In the first mode, the controller 106 sends control signals to turn on the first switching element 346, and turn off the second switching element 356 and the third switching element 372. Each of the first converting stage 310 and the second converting stage 320 operates in a manner similar to the first converting stage 210 as described above with regard to FIG. 5. Each of the third converting stage 330 and the fourth converting stage 340 operates in a manner similar to the second converting stage 220 as described above with regard to FIG. 5.

In the first mode of the charging process, the switching element 322 in the first converting stage 310 is turned off, and the switching element 318 in the first converting stage 320 operates in the PWM mode. Moreover, the switching element 332 in the second converting stage 320 is turned off, and the switching element 328 in the second converting stage 320 operates in the PWM mode. In an embodiment of the present invention, the PWM mode control signals sent to the switching element 318 and the switching element 328 are in phase. In embodiments of the present invention, the PWM mode control signals sent to the switching element 318 and the switching element 328 are out of phase. For example, the control signals for the switching element 318 may lead or lag the control signals for the switching element 328 by $\pi/2$, thereby reducing DC voltage ripples across the capacitor 344.

Similarly, in the first mode of the charging process, the switching element 354 in the third converting stage 330 is turned off, and the switching element 352 in the third converting stage 330 operates in the PWM mode. Moreover, the switching element 364 in the fourth converting stage 340 is turned off, and the switching element 362 in the fourth converting stage 340 operates in the PWM mode. In an embodiment of the present invention, the control signals sent to the switching element 352 and the switching element 362 are in phase. In embodiment s of the present invention, the control signals sent to the switching element 352 and the switching element 362 are out of phase. For example, the control signals for the switching element 352 may lead or lag the control signals for the switching element 362 by $\pi/2$, thereby reducing DC voltage ripples across the stack 390.

When the controller 106 determines that the voltage difference between the rectified DC voltage 302 and the DC voltage 306 is substantially smaller than the threshold value, the controller 106 controls the bi-directional converter 120 to operate in the second mode. The controller 106 sends control signals to turn on the second switching element 356 and the third switching element 372.

Figure 9:
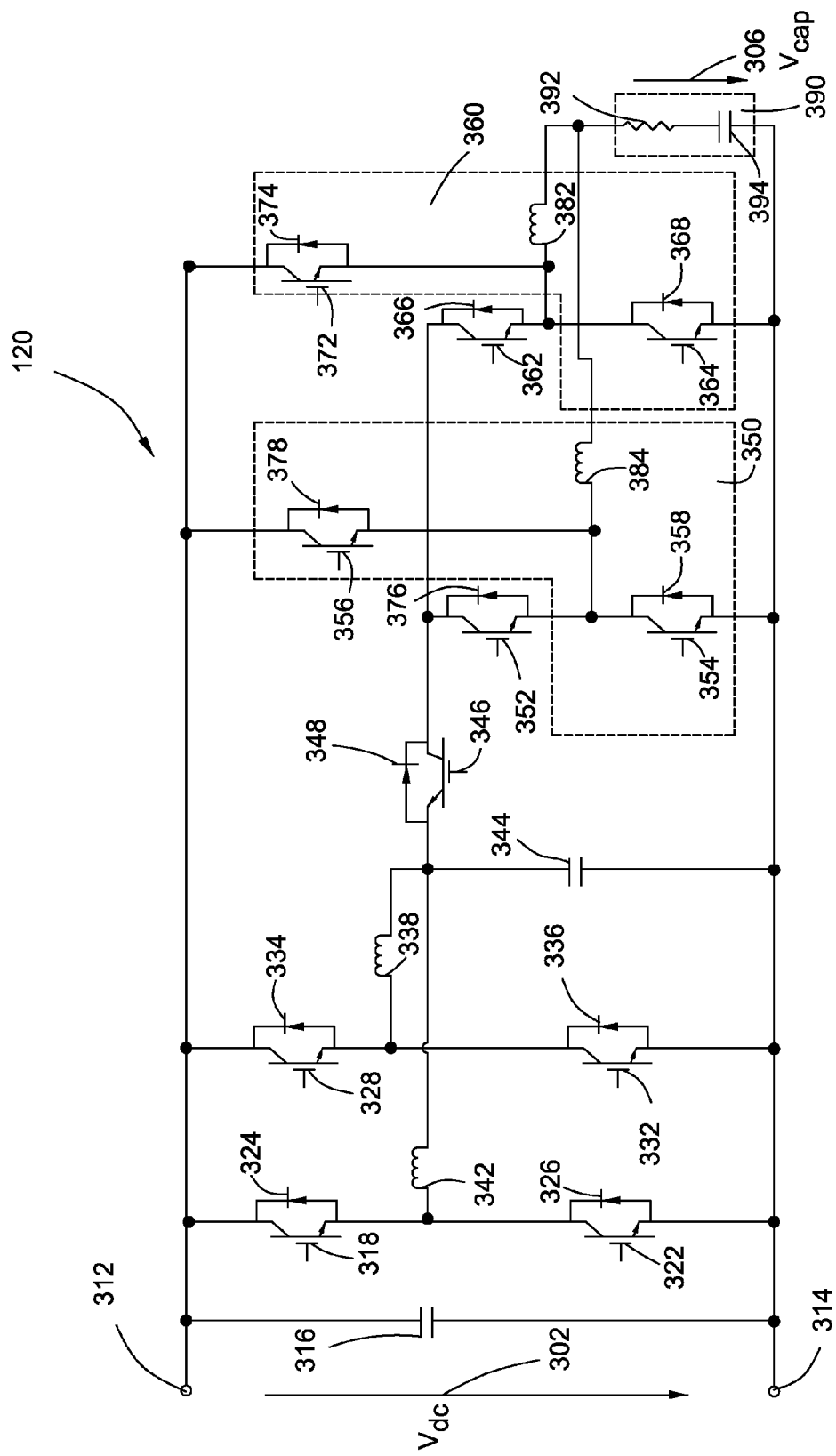
FIG. 9 is the topology of a bi-directional converter shown in FIG. 7, and the bi-directional converter operates in a second mode.

In the second mode of the charging process, the switching element 352 and the switching element 362 are turned off in response to control signals sent from the controller 106. The two switching elements 354, 356 and the inductor 384 form a fifth converting stage 350, and the two switching elements 364, 372 and the inductor 382 form a sixth converting stage 360 as shown in FIG. 9. For the fifth converting stage 350 operating in the buck mode, the switching element 354 is turned off and the switching element 356 operates in the PWM mode. The rectified DC voltage 302 is directly converted to the DC voltage 306. Because the DC voltage 306 at the stack 390 is high and the voltage difference between the rectified DC voltage 302 and the DC voltage 306 is low, the transformation efficiency of the bi-directional converter 120 is high.

With continuing reference to FIGS. 8 and 9, the bi-directional converter 120 may operate to discharge the stack 390. During the discharging process, the bi-directional converter 120 shown in FIGS. 8 and 9 may operate in a manner similar to the bi-directional converter 110 as described above in connection with FIGS. 5 and 6.

Figure 10:
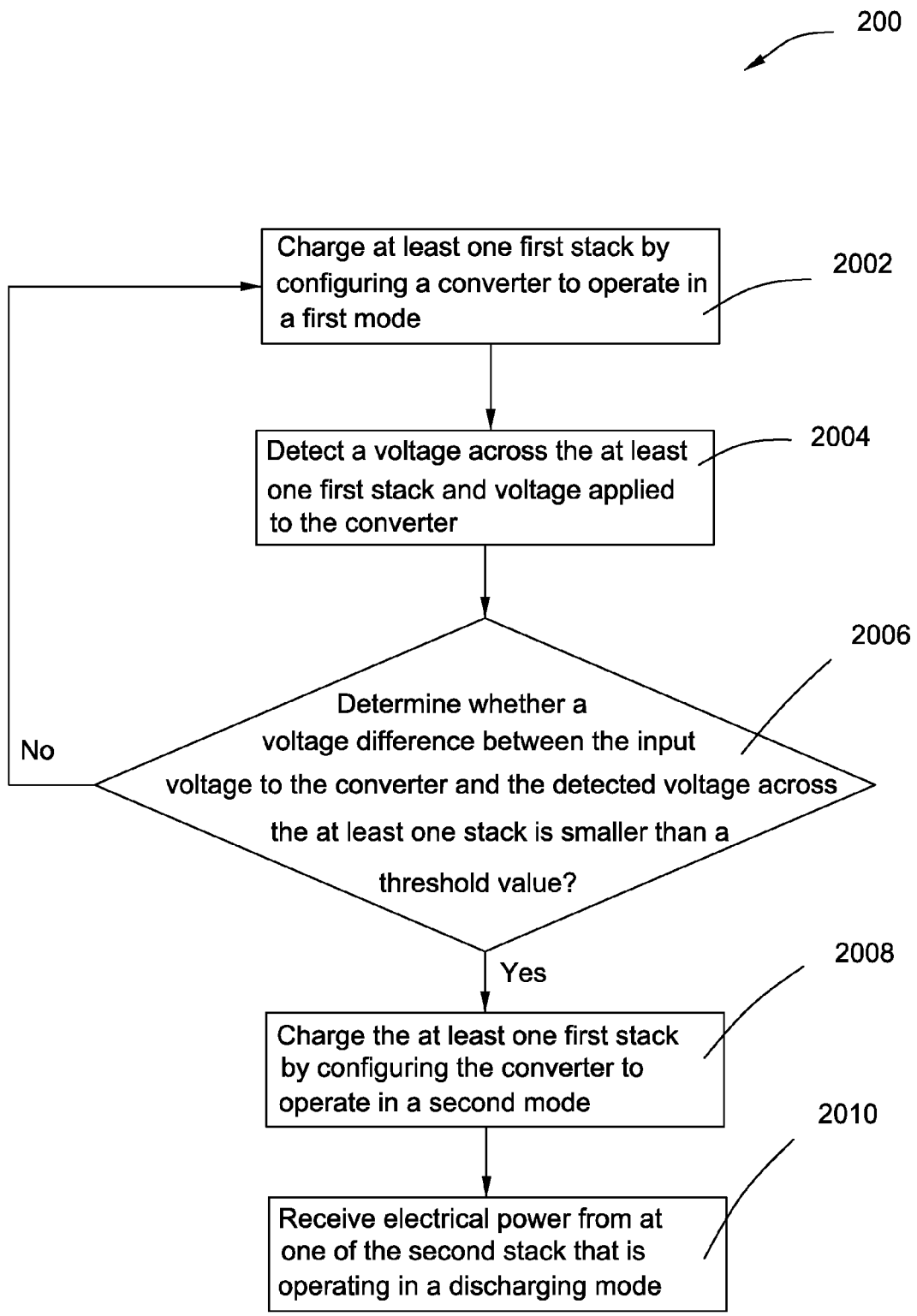
FIG. 10 is a flowchart illustrating various steps of a method for charging a stack in accordance with an embodiment of the present invention.

FIG. 10 illustrates a flowchart of a method 200 for operating the system 100 shown in FIG. 1 to charge one or more stacks in accordance with an embodiment of the present invention.

In the illustrated embodiment of the present invention, the method 200 begins at block 2002. At block 2002, one ore more converters are configured in a first mode to charge one or more stacks. In an embodiment of the present invention, either the bi-directional converter 110 shown in FIG. 5 or the bi-directional converter 120 shown in FIG. 8 may be operated to charge one or more stacks. For example, the bi-directional converter 110 shown in FIG. 5 is operated to convert the rectified DC voltage 202 to the DC voltage 206, so as to charge the stack 260. In an embodiment, in the first mode, the first converting stage 210 operates to convert the rectified DC voltage 202 to the intermediate DC voltage 204, and the second converting stage 220 operates to convert the intermediate DC voltage 204 to the DC voltage 206.

At block 2004, the method 200 continues to detect a voltage across the one or more stacks and an input voltage to the one or more converters. In an embodiment of the present invention, the controller 106 (shown in FIG. 1) may detect the DC voltage 206 across the stack 260. The controller 106 may further detect the rectified DC voltage 202 applied to the bi-directional converter 110.

At block 2006, the method 200 continues to determine whether a voltage difference between the detected voltage across the one or more stacks and the input voltage to the one or more converters is smaller than a threshold value. In an embodiment of the present invention, the controller 106 shown in FIG. 1 may perform the action of block 2006. If the voltage difference is determined to be smaller than the threshold value, the method 2000 proceeds to block 2008. If the voltage difference is determined to be greater than the threshold value, the method 2000 returns to the block 2002, where the converters are configured to remain in the first mode.

At block 2008, the method 200 continues to configure the one ore more converters in a second mode, so as to charge the one ore or more stacks. In an embodiment of the present invention, the controller 106 switches the bi-directional converter 110 from the first mode to the second mode. In the second mode, the converting stage 230 (shown in FIG. 6) operates to directly convert the rectified DC voltage 202 to the DC voltage 206.

At block 2010, the method 200 continues to receive electrical power from at least one stack that is operating in a discharging state. In an embodiment of the present invention, the electrical power received by the bi-directional converter 142 may be recovered from the first stack 132 in the second line 116 working in the discharging state. In an embodiment of the present invention, the electrical power received by the bi-directional converter 142 may be provided from the first rectifier 102 (shown in FIG. 1).

Figure 11:
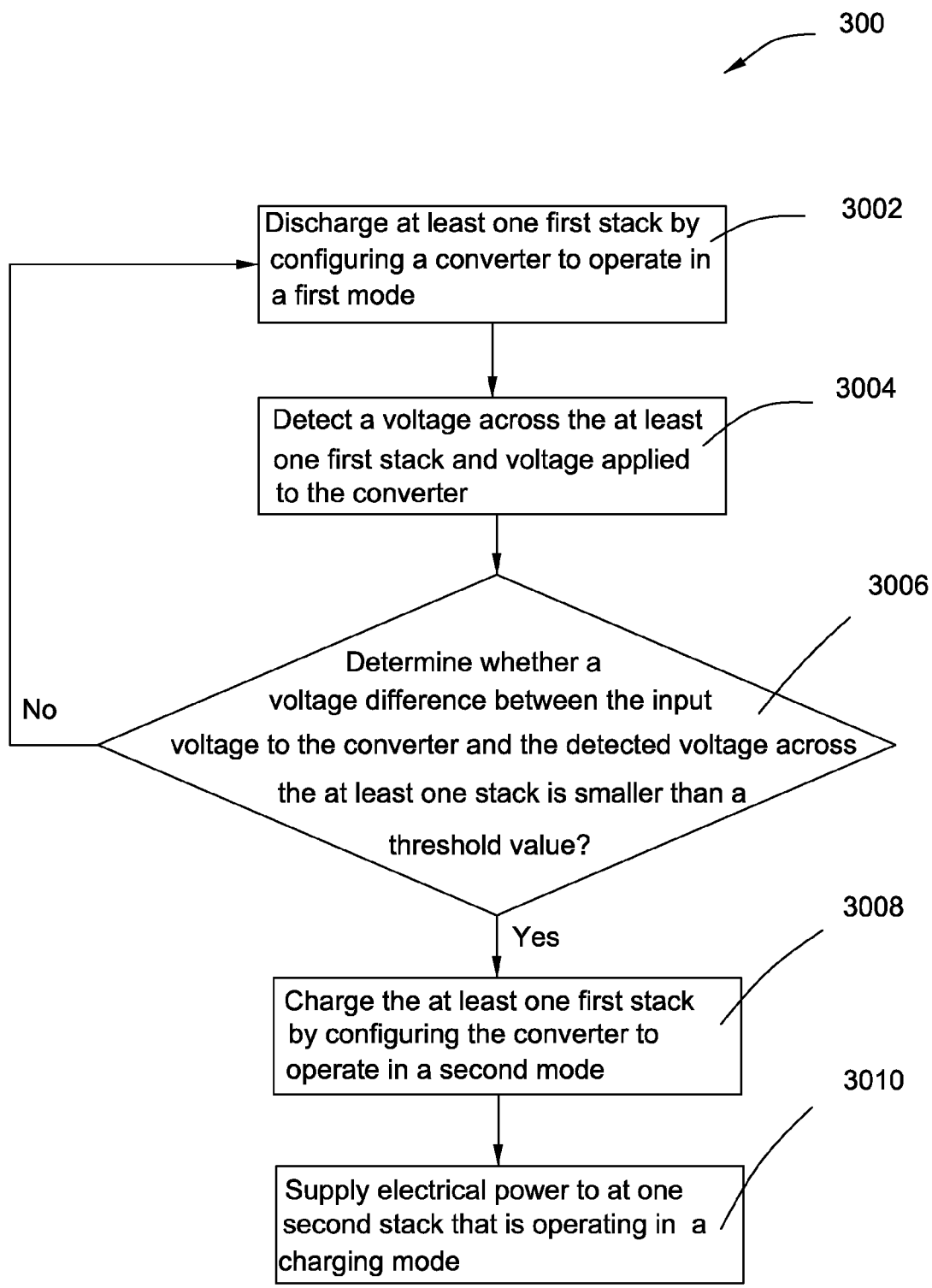
FIG. 11 is a flowchart illustrating various steps of a method for discharging a stack in accordance with an embodiment of the present invention.

FIG. 11 illustrates a flowchart of a method 300 for operating the system 100 shown in FIG. 1 to discharge one or more stacks in accordance with an embodiment of the present invention.

In the illustrated embodiment of the present invention, the method 300 begins at block 3002, at which one or more converters are configured in a first mode for recovering electrical energy discharged from one ore more stacks. In an embodiment of the present invention, the bi-directional converter 142 shown in FIG. 1 may be operated to recover the electrical energy from the first stack 122. In the first mode, because the voltage across the stack 260 is high, the bi-directional converter 110 has the converting stage 230 (shown in FIG. 6) operating to boost the DC voltage 206 of the first stack 122 up to the DC voltage 202 at the two first input terminals 212, 214.

At block 3004, the method 300 continues to detect the voltage across the one ore more stacks and the voltage at the input terminals of the one or more converters. In an embodiment of the present invention ion, the controller 106 (shown in FIG. 1) detects the DC voltage 206 across the stack 260 and the DC voltage 202 at the two input terminals 212, 214.

At block 3006, the method 300 continues to determine whether the voltage difference between the detected voltage across the one or more stacks and the voltage at the input terminals of the one or more converters is smaller than a threshold value. In an embodiment of the present invention, the controller 106 performs the action of block 3006. If the voltage difference is determined to be smaller than the threshold value, the method proceeds to block 3008. If the voltage difference is determined to be greater than the threshold value, the procedure returns to block 3002.

At block 3008, the method 300 continues to configure the one or more converters in a second mode for recovering electrical energy discharged from the one or more stacks. In an embodiment of the present invention, the controller 106 switches the bi-directional converter 110 from the first mode to the second mode.

At block 3010, the method 300 continues to supply electrical power to at least one stack that is operating in a charging state. In an embodiment of the present invention, the electrical energy recovered with the bi-directional converter 142 operating in the first mode and the second mode may be supplied to the first stack 132 in the second line 116 working in the charging state.

The methods 200 and 300 described above may be programmed with instructions stored in a computer-readable medium, which when executed by a processor, perform various steps of the methods 200 and 300. The computer-readable medium may include volatile and nonvolatile, removable and non-removable media implemented in any method or technology. The computer-readable medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system.

The operations described in the methods 200 and 300 do not necessarily have to be performed in the order set forth in FIGS. 10 and 11, but instead may be performed in any suitable order. Additionally, in certain embodiments of the present invention, more or less than all of the elements or operations set forth in FIGS. 9 and 10 may be performed.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, a person skilled in the art will recognize the interchangeability of various features from different embodiments. The various features described, as well as other known equivalents for each feature, can be mixed and matched by one of ordinary skill in this art to construct additional systems and techniques in accordance with principles of this disclosure.

What is claimed is:

1. A system for de-ionizing a liquid having charged species, the system comprising:
   a plurality of stacks operating in a charging state and a discharging state; and
   a plurality of converters, wherein each of the plurality of converters is:
      electrically coupled to a corresponding one of the plurality of stacks,
      configured to charge the corresponding stack for adsorbing ions in the liquid in the charging state, and to discharge the corresponding stack for desorbing ions adsorbed by the corresponding stack in the discharging state, and
      configured to operate in a first mode or a second mode depending on a charging state or a discharging state of the corresponding stack,
   wherein when the corresponding stack is charged or discharged at a first state, a converter of the plurality of converters coupled to the corresponding stack is configured to operate in the first mode, and to indirectly convert a first voltage to a second voltage at least by an intermediate stage, and
   wherein when the corresponding stack is charged or discharged at a second state, a converter of the plurality of converters coupled to the corresponding stack is configured to operate in the second mode, and to directly convert the first voltage to the second voltage.

2. The system of claim 1, wherein the plurality of stacks comprises:
   a first set of stacks arranged along a first path; and
   a second set of stacks arranged along a second path,
   wherein the first set of stacks is configured to de-ionize liquid feeding through the first path, and the set of second stacks is configured to de-ionize liquid feeding through the second path.

3. The system of claim 1, wherein one of the plurality of converters comprises a bi-directional converter configured to convert electrical energy to the corresponding stack in the charging state, and to recover electrical energy from the corresponding stack in the discharging state.

4. The system of claim 3, wherein the electrical energy recovered from the corresponding stack is transferred to another stack of the plurality of stacks operating in the charging stage.

5. The system of claim 1, further compromising a controller electrically coupled to the plurality of converters,
   wherein the controller is configured to determine a voltage difference between a voltage supplied to the converter and a voltage applied to the corresponding stack,
   wherein when the voltage difference is substantially greater than a threshold value, the controller controls the converter to operate in the first mode, and
   wherein when the voltage difference is substantially smaller than the threshold value, the controller controls the converter to operate in the second mode.

6. The system of claim 1, wherein each of the plurality of converters comprises:
   a first converting stage;
   a second converting stage coupled in series with the first converting stage; and
   an energy storing element coupled between the first converting stage and the second converting stage.

7. The system of claim 6, wherein each of the plurality of converters further comprises:
   a third converting stage configured similar to the first converting stage, wherein the third converting stage is interleaved with the first converting stage; and
   a fourth converting stage configured similar to the second converting stage, wherein the fourth converting stage is interleaved with the second converting stage.

8. The system of claim 7,
   wherein the first converting stage and the third converting stage are supplied with control signals out of phase, and
   wherein the second converting stage and the fourth converting stage are supplied with control signals out of phase.

9. The system of claim 6, wherein when the converter is configured to charge the corresponding stack in the first mode,
   the first converting stage is configured to convert the first voltage down to an intermediate voltage,
   the energy storing element is charged to maintain a level of the intermediate voltage, and
   the second converting stage is configured to convert the intermediate voltage down to the second voltage.

10. The system of claim 6, wherein when the converter is configured to charge the corresponding stack in the second mode,
    the first converting stage is disabled, and
    the second converting stage is configured to convert the first voltage down to the second voltage directly.

11. The system of claim 6, wherein when the converter is configured to discharge the corresponding stack in the first mode,
    the second converting stage is configured to convert the first voltage up to an intermediate voltage,
    the energy storing element is charged to maintain a level of the intermediate voltage, and
    the first converting stage is configured to convert the intermediate voltage up to the second voltage.

12. The system of claim 6, wherein when the converter is configured to discharge the corresponding stack in the second mode,
    the first converting stage is disabled, and
    the second converting stage is configured to convert the first voltage up to the second voltage directly.

13. The system of claim 6, wherein the first converting stage comprises:
    a first switching element coupled with an anti-parallel diode;
    a second switching element coupled with an anti-parallel diode; and
    a first inductor,
    wherein the first switching element and the second switching element are coupled in series between a first input terminal and a second input terminal of the converter, and
    wherein a terminal of the first inductor is coupled to a junction between the first switching element and the second switching element, and an other terminal of the first inductor is coupled to a terminal of the energy storing element.

14. The system of claim 13, wherein the second converting stage comprises:
a third switching element coupled with an anti-parallel diode;
a fourth switching element coupled with an anti-parallel diode; and
a second inductor,
wherein the third switching element and the fourth switching element are coupled in series between two terminals of the energy storing element,
wherein a terminal of the second inductor is coupled to a junction between the fourth switching element and the fifth switching element, and
wherein an other terminal of the second inductor is coupled to a terminal of at least one stack of the plurality of stacks.

15. The system of claim 14, further comprising:
a fifth switching element coupled with an anti-parallel diodes; and
a sixth switching element coupled with an anti-parallel diode,
wherein the fifth switching element is coupled between the first converting stage and the second converting stage, and
wherein the sixth switching element is coupled between the first input terminal of the converter and a junction between the third switching element and the fourth switching element.

* * * * *